UNITED STATES PATENT OFFICE.

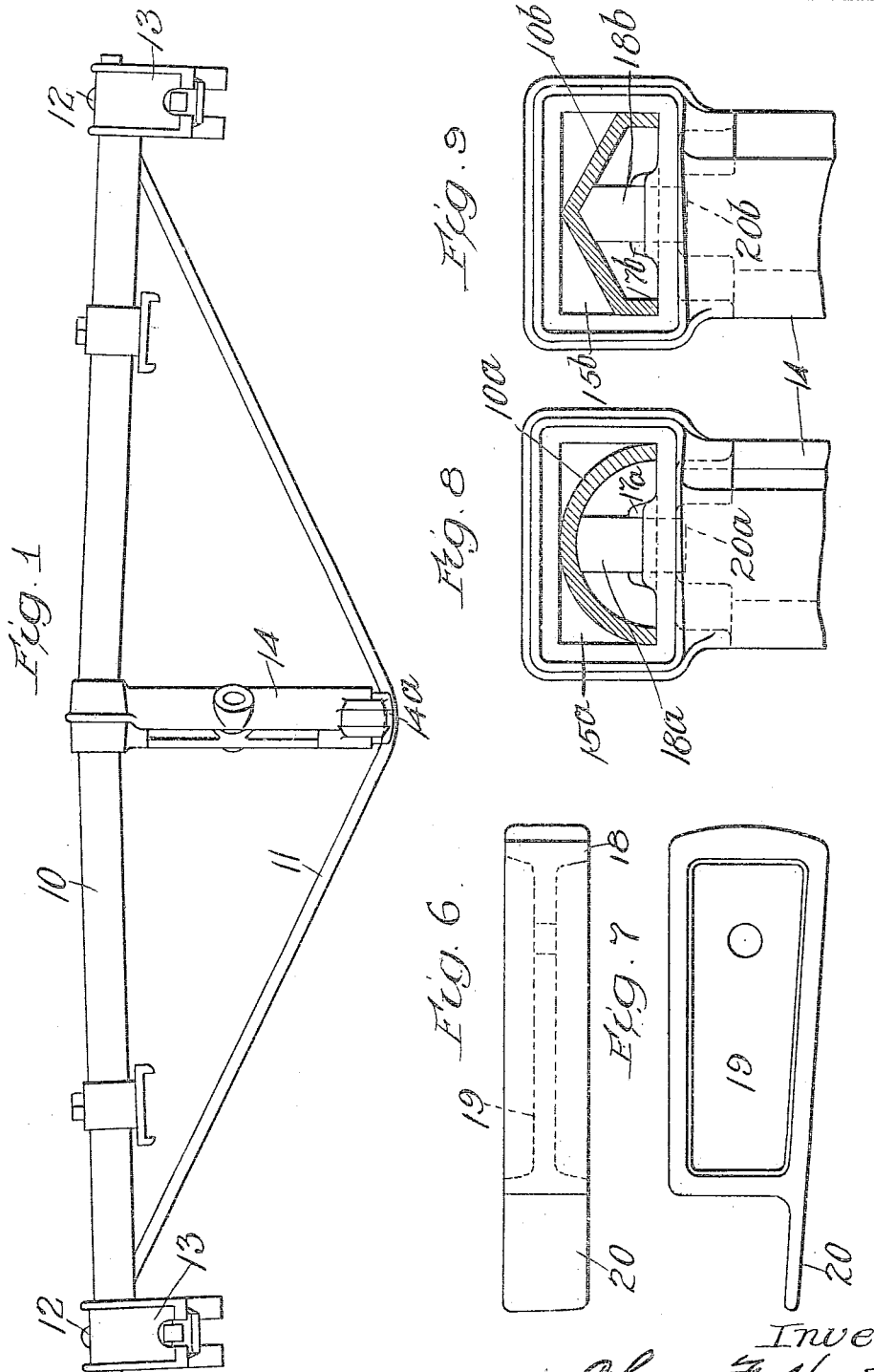

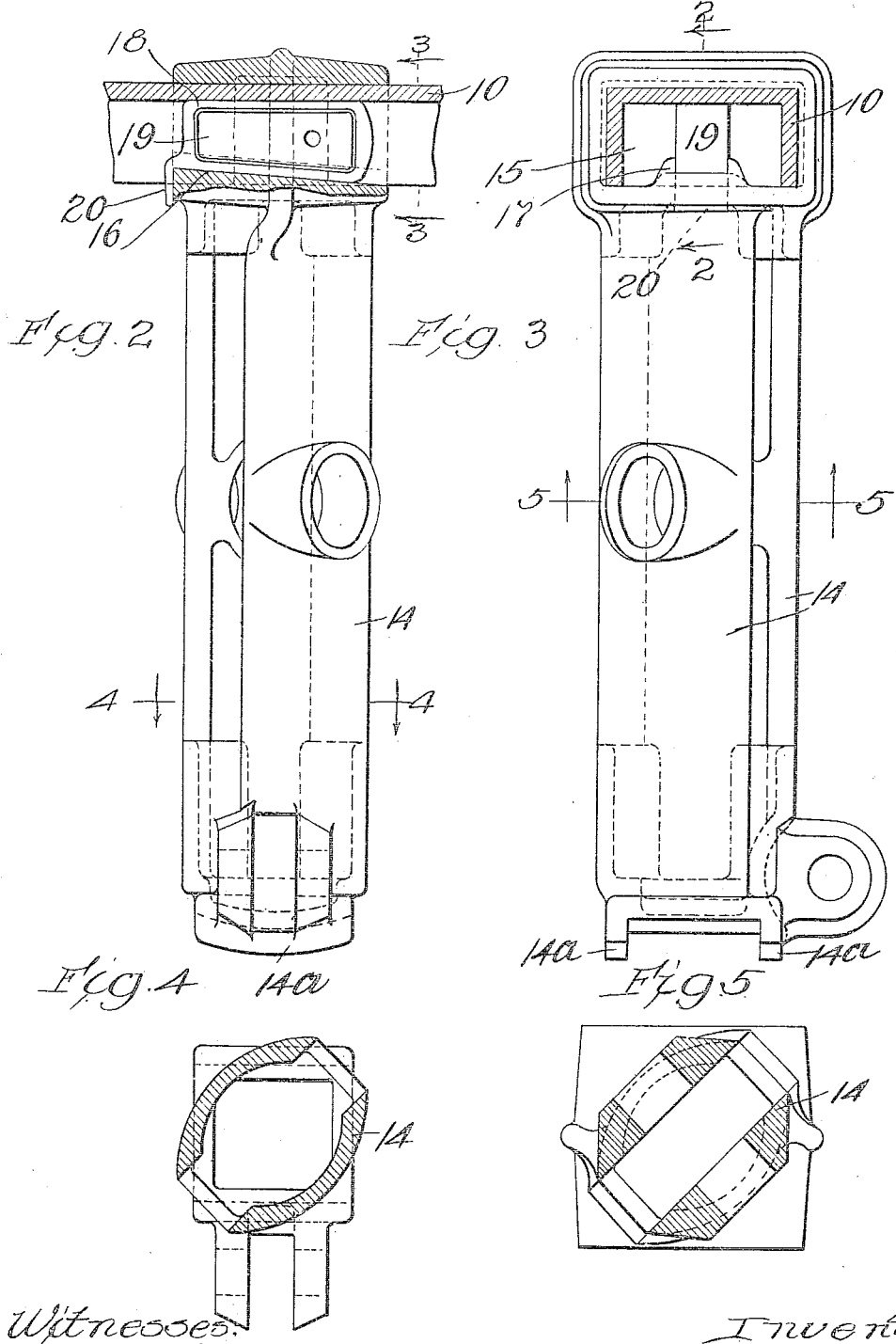

CHARLES F. HUNTOON, OF CHICAGO, ILLINOIS, ASSIGNOR TO HENRY D. LAUGHLIN, OF CHICAGO, ILLINOIS.

BRAKE-BEAM.

953,695.   Specification of Letters Patent.   Patented Apr. 5, 1910.

Application filed May 28, 1909. Serial No. 498,915.

*To all whom it may concern:*

Be it known that I, CHARLES F. HUNTOON, a citizen of the United States, and a resident of Chicago, in the county of Cook and State of Illinois, have invented certain new and useful Improvements in Brake-Beams, of which the following is a full, clear, and exact specification.

My invention is concerned with brake beams of the general type shown in my Patent No. 895,269, dated August 4, 1908, and is designed to produce a simple and inexpensive connection between the compression member and the strut bar, which connections can be readily applied, and which will firmly and lastingly secure the parts together without weakening the structure and without necessitating the employment of an undue quantity of material at the point of connection to prevent weakness.

To illustrate my invention I annex hereto two sheets of drawings in which the same reference characters are used to designate identical parts in all the figures, of which—

Figure 1 is a top plan view of a brake beam in which my invention may be employed. Fig. 2 is an enlarged view in section on the line 2—2 of Fig. 3. Fig. 3 is a section on the line 3—3 of Fig. 2. Fig. 4 is a section on the line 4—4 of Fig. 2. Fig. 5 is a section on the line 5—5 of Fig. 3. Figs. 6 and 7 are side and top plan views respectively of the locking key detached; and Figs. 8 and 9 are views similar to Fig. 3 but showing a modified form in cross section of the compression member.

As is well known to those who are conversant with the art, trussed brake beams are made up of a compression member 10 which is a flanged metal bar, generally U-shaped in cross section, and which may be of a generally rectangular shape open at one side, shown in cross section in Fig. 3, or of the semi-circular shape shown in cross section at 10ª in Fig. 8, or of the angular cross section shape shown at 10ᵇ in Fig. 9. The tension member 11 may be a flat metal bar which has its ends secured to the ends of the compression member, preferably by the same bolts 12 and connections by which the brake shoe heads 13 are secured to the ends of the brake beam. The strut member 14 is of course interposed between the centers of the compression member and the tension member, as is essential in producing the king post truss construction desired. The tension member 11 may be connected in any desired manner with its end of the strut member 14, and I have shown it as curved over said end and held in place by the projections 14ª, best shown in Figs. 2 and 3.

The brake beam thus far described may be of the construction shown in my aforesaid Patent No. 895,269, or of any similar construction.

The specific feature of my invention to which the present patent is directed is the connections between the compression member 10 and its end of the strut member 14, and these connections are formed by making a generally rectangular aperture 15 in that end of the strut member through which the compression member passes, as is shown in Figs. 2, 3, 8 and 9. The aperture is preferably shaped, as shown in Fig. 3, so that the outer sides of the compression member 10 will snugly engage the corresponding sides of the aperture 15. In the side of the aperture 15 corresponding to the open side of the compression member, I provide the preferably inclined surface 16, so that the opposed side, or at any rate a portion of the opposed side of the aperture converges relative thereto as shown in Fig. 2. On either side of this surface 16 I preferably provide the ribs 17 projecting inwardly so as to form a guiding and retaining channel in which the key 18 is directed as the parts are assembled. This key 18, best shown in Figs. 6 and 7, preferably has its operating sides converging on the same angle as the corresponding sides of the aperture 15, and the central portion 19 may be conveniently reduced to the thickness of a narrow web. At the narrower end I provide the tongue 20 which is adapted to be bent over the edge of the aperture when the parts are assembled, as shown in Fig. 2, to prevent any possible displacement of the parts. Where the compression members are of different form in cross section, as 10ª in Fig. 8, and 10ᵇ in Fig. 9, the keys 18ª and 18ᵇ will be of the same construction as the key 18, except that the side coöperating with the interior of the compression member will have a shape corresponding to the shape of the engaging surface in the compression member.

From the foregoing description it will be seen that I have provided a simple and inexpensive connection between the compression member and the strut member, which connection can be readily and securely assembled, and which will keep the parts rigidly connected despite the severe usage to which these devices are subjected.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new and desire to secure by Letters Patent of the United States is:

1. In a brake beam, the combination with a compression member and a tension member connected at their ends, said compression member being generally U-shaped in cross section, of a strut interposed between said members and having an aperture through which the compression member passes, said aperture being provided with guide ribs along the side opposite the compression member and a key interposed between said ribs, and impinging against the strut and the compression member.

2. In a brake beam, the combination with a compression member and a tension member connected at their ends, said compression member being generally U-shaped in cross section, of a strut interposed between said members having an aperture with converging sides through which the compression member passes, one of said converging sides being provided with a guide slot, and a wedge shaped key interposed in said slot between that side of said aperture and the compression member.

3. In a brake beam, the combination with a compression member and a tension member connected at their ends, said compression member being generally U-shaped in cross section, of a strut interposed between said members having an aperture with converging sides through which the compression member passes, one of said converging sides being provided with a guide slot, and a wedge shaped key interposed in said slot between that side of said aperture and the compression member and provided with a tongue adapted to be turned over an edge of the aperture to hold the key in place.

In witness whereof, I have hereunto set my hand and affixed my seal, this 18th day of May, A. D. 1909.

CHARLES F. HUNTOON. [L. S.]

Witnesses:
 JOHN HOWARD McELROY,
 F. E. BROM.